United States Patent
Lauhoff et al.

(10) Patent No.: US 12,359,699 B2
(45) Date of Patent: Jul. 15, 2025

(54) DRIVE ARRANGEMENT FOR A BICYCLE

(71) Applicant: ZF Friedrichshafen AG, Friedrichshafen (DE)

(72) Inventors: Jakob Lauhoff, Tübingen (DE); Kevin Holder, Meckenbeuren (DE); Oliver Löchte, Wangen (DE); Janik Pagel, Lindau (DE); Finn Neumann, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/918,652

(22) Filed: Oct. 17, 2024

(65) Prior Publication Data
US 2025/0129826 A1  Apr. 24, 2025

(30) Foreign Application Priority Data
Oct. 19, 2023 (DE) .......... 102023210289.7

(51) Int. Cl.
| | | |
|---|---|---|
| *F16D 41/30* | (2006.01) | |
| *B62J 45/41* | (2020.01) | |
| *B62M 1/36* | (2013.01) | |
| *B62M 11/02* | (2006.01) | |

(52) U.S. Cl.
CPC .............. *F16D 41/30* (2013.01); *B62J 45/41* (2020.02); *B62M 1/36* (2013.01); *B62M 11/02* (2013.01)

(58) Field of Classification Search
CPC .......... F16D 41/30; F16D 41/12; B62J 45/41; B62M 1/36; B62M 11/02
See application file for complete search history.

(56) References Cited

U.S. PATENT DOCUMENTS

| | | | | |
|---|---|---|---|---|
| 4,838,401 A | * | 6/1989 | Nagano | B62M 9/10 192/64 |
| 7,617,920 B2 | | 11/2009 | Kanehisa | |
| 8,757,012 B2 | | 6/2014 | Strothmann | |
| 2007/0089958 A1 | * | 4/2007 | Kanehisa | F16D 41/30 192/64 |
| 2015/0053523 A1 | * | 2/2015 | Lim | F16D 41/064 192/41 R |
| 2017/0291449 A1 | * | 10/2017 | Yamamoto | B60B 27/047 |

FOREIGN PATENT DOCUMENTS

| | | |
|---|---|---|
| DE | 102012100682 A1 | 11/2012 |
| DE | 102015210699 A1 | 12/2016 |
| EP | 1881221 A2 | 1/2008 |

OTHER PUBLICATIONS

German Search Report for Application No. 102023210289.7 Dated Feb. 19, 2024.

* cited by examiner

*Primary Examiner* — Timothy Hannon
(74) *Attorney, Agent, or Firm* — Dority & Manning, P.A.

(57) ABSTRACT

A drive arrangement for a bicycle includes a pawl freewheel, the pawl freewheel having a first ring, at least two pawls movably mounted on the first ring, and a second ring having a toothing. The at least two pawls are unevenly spaced in the circumferential direction on the first ring. The drive arrangement further includes at least one sensor device configured to detect a deformation of the first ring of the pawl freewheel due to an applied drive force.

11 Claims, 2 Drawing Sheets

DRIVE ARRANGEMENT FOR A BICYCLE

CROSS-REFERENCE TO RELATED APPLICATION

The present application is related and has right of priority to German Patent Application No. 10 2023 210 289.7 filed on Oct. 19, 2023, the entirety of which is incorporated by reference for all purposes.

FIELD OF THE INVENTION

Aspects of the present invention relate generally to a drive arrangement for a bicycle. Furthermore, aspects of the present invention relate generally to a bicycle.

BACKGROUND

Bicycles are known to have a freewheel. This allows, for example, a pedal crankshaft to be disengaged from a driven wheel. This allows the bicycle to roll without the respective pedals of the bicycle turning. On pedelecs, for example, a freewheel is also usable to disengage a drive motor. In a locked state, on the other hand, the freewheel connects two shafts to each other for conjoint rotation, for example to enable the transmission of drive power.

By detecting a deformation of a component of the freewheel, the transmitted drive force is detectable, for example to control a drive. However, depending on the freewheel and the relative position in which the two shafts are connected to each other, disturbance variables occur. For example, a radial force that acts in the freewheel in the locked state, deforms the freewheel depending on a locked state position. Accordingly, the detected deformation only corresponds imprecisely to the transmitted drive force.

DE 10 2012 100 682 A1 describes a torque sensor and a freewheel which has a first rotary element by which a torque to be determined is transmittable to a second rotary element coaxial with the first rotary element in one direction of rotation. In addition, a device for determining a rotation of the first rotary element relative to the second rotary element in said direction of rotation and for determining the torque on the basis of the determined rotation is described. The torque determination is thus very complex.

SUMMARY OF THE INVENTION

A first aspect relates to a drive arrangement for a bicycle. The drive arrangement has, for example, a transmission, a pedal crankshaft, a wheel, and respective power transmission elements to the wheel. The drive arrangement has a drive motor, for example, an electric motor. The drive arrangement is for a bicycle, particularly a pedelec. The drive arrangement transmits a drive force from a cyclist and, optionally, from the drive motor to the wheel.

The drive arrangement has a pawl freewheel. A pawl freewheel is also referred to as a ratcheting freewheel. A freewheel, for example, only transmits torque in one direction of rotation, wherein the freewheel is then in its locked state. With a relative reversal of the direction of rotation, on the other hand, a connection is automatically released, which means that the freewheel is then in its release state. In the locked state, the respective pawls of the pawl freewheel are engaged. In the release state, however, the pawls of the pawl freewheel slide off, for example. The pawl freewheel, for example, decouples a drive, such as a pedal crankshaft, from an output. For example, the pawl freewheel also decouples the pedal crankshaft from the drive motor or the drive motor from the pedal crankshaft. The pawl freewheel also changes a gear in the transmission of the drive arrangement.

The pawl freewheel has at least a first ring and a second ring. The two rings are each permanently connected to a shaft of the drive arrangement so that they cannot rotate. The rings also form a disc. For example, a ring formed as an inner ring with a radially extending wall is non-rotatably connected to a shaft. The rings also have respective non-ring-shaped partial areas and alternatively, or additionally, decentralized through-openings.

The second ring has a toothing. The toothing, for example, extends radially inwards or outwards along a circumference of the second ring. The toothing is for engagement by the pawls. The pawl freewheel has at least two pawls mounted movably on the first ring. The pawls are also referred to as locking pawls. The pawls are, for example, mounted on the first ring at an end facing the second ring so that they swivel about an axial axis of rotation. The pawls are in engagement with the teeth of the second ring in a locked state of the pawl freewheel, for example. The pawls are spring-biased with respect to the engagement, for example. In a release state, the engagement of the pawls with the toothing is cancelled. In the locked state, the two rings are non-rotatably connected to each other via the engagement. In the release state, the pawls slide off the toothing, for example, and the two rings rotate relative to each other in one direction of rotation. The pawls, for example, allow the two rings to rotate relative to each other in one direction of rotation and prevent them from rotating in the opposite direction once the pawl has engaged with the toothing. The pawls and the toothing are arranged on sides of the two rings facing each other. The two rings are coaxial to each other. The two rings are in the same axial area. The two rings are each be mounted so that they rotate about a centre axis. For example, one of the two rings is permanently connected for conjoint rotation to an input shaft of the pawl freewheel or a shaft of the drive arrangement. For example, another of the two rings is permanently connected for conjoint rotation to an output shaft of the pawl freewheel or a shaft of the drive arrangement.

The drive arrangement has a sensor device which is configured to detect a deformation of the first ring of the pawl freewheel due to an applied drive force. The drive force is, for example, transmitted to the second ring in the locked state or transmitted from the second ring to the first ring in the locked state. The drive force is, for example, introduced into the drive arrangement by a rider of the bicycle at the respective pedals. The detected deformation, for example, provides information about the transmitted torque. The applied drive force corresponds to the transmitted torque. The detection, for example, enables a power measurement, automatic control of a gear shift of the bicycle, and, alternatively or additionally, control of the drive motor. The control also takes place directly as a function of the detected deformation.

The sensor device is, for example, at least one sensor. The sensor is attached to the first ring. If several sensors are provided, these are arranged evenly spaced in the circumferential direction. If several sensors are provided, they are arranged at the same circumference on the first ring or at the same radial distance from an axis of rotation. The sensors are, for example, arranged axially at the height of the pawl freewheel. The sensor device, for example, determines the deformation electroresistively, magnetically, optically, or acoustically. For example, the sensor device has one or more strain gauges attached to the first ring. Alternatively, a Hall sensor is also usable, for example. The sensor device has an evaluation device to evaluate the respective sensor signals. If several sensors are provided, their sensor signals are mergeable into a single measured value, for example.

The pawls are arranged unevenly spaced in the circumferential direction on the first ring. For example, a distance between a first pawl and a second pawl is greater in a left-hand circumferential direction than in a right-hand circumferential direction. If, for example, three pawls are provided, a distance between the first pawl and the second pawl is greater in a circumferential direction than between the second pawl and the third pawl. For example, a distance between two neighbouring pawls differs from a distance between two other neighbouring pawls. For example, when the first latch cis located at an 11 o'clock position, the second latch is at a 1 o'clock position, and the third latch is at a 6 o'clock position. The position using clock times is used here to visualize the distance, which is fixed. Rotation of the two rings changes the actual position of the latches during operation, but not their relative distance from each other. The following explanations for two pawls apply equally to three or more pawls, if applicable. The spacing in the circumferential direction corresponds to an angular spacing. Between two pawls or groups of pawls there is a pawl-free circumferential area.

A distance in the circumferential direction between two pawls is an angle between a first pawl and a second pawl adjacent to it in the circumferential direction, starting from a centre point or an axis of rotation of the pawl freewheel. It is measured, for example, at a bearing point or an engagement point of the two pawls. For example, the angular distance between two pawls is based on the same point for each pawl.

Due to the uneven spacing in the circumferential direction, there is a particularly large pawl-free circumferential area on the first ring. In this pawl-free circumferential area, the deformation caused by the applied drive force is detected particularly precisely. Disturbance variables, for example due to radial reaction forces on the pawls, are low here and may also have homogenized. This effect is greatest in the centre of the pawl-free circumferential area. For example, a sensor is arranged in the centre of the circumferential direction in a pawl-free circumferential area. The selected pawl-free circumferential area is the largest pawl-free circumferential area. In addition, the applied drive force is precisely detected even with a large number of pawls. A large drive force is transmittable by a large number of pawls. However, with many pawls, not all pawls are evenly engaged due to manufacturing tolerances, for example. Due to the uneven spacing of the pawls, however, this only has a minor interference effect on the measurement signal. For example, the pawls of the pawl freewheel are arranged closely in two or more groups and a large distance is provided between these groups. The grouping also bundles introduced forces so that tangential forces dominate on the whole.

In one embodiment of the drive arrangement, the first ring may be an inner ring and the second ring an outer ring. The second ring is arranged radially on the outside of the first ring. The toothing is then arranged radially on the inside of the second ring. This can make production particularly cost-effective and simple. In addition, the respective sensors are easily attached to the first ring. The respective pawls, for example, are mounted radially on the outside of the first ring.

In one embodiment of the drive arrangement, it may be provided that the first ring is an outer ring and the second ring is an inner ring. The first ring is arranged radially on the outside of the second ring. The toothing is then arranged radially on the outside of the second ring. The respective pawls, for example, are mounted radially on the inside of the first ring. This simplifies the assembly of the pawls.

The outer ring is, for example, moulded as a separate component or alternatively as an integrated component, for example the outer ring can be integrated into the output shaft as an integrated component. In other words, the output shaft is provided with a toothing that forms the integrated outer ring. The inner ring is, for example, moulded as a separate component or alternatively moulded as an integrated component, for example the inner ring can be integrated into the bottom bracket shaft as an integrated component. In other words, the bottom bracket shaft is provided with a toothing that forms the integrated inner ring.

In one embodiment of the drive arrangement, the second ring has a continuous toothing in the circumferential direction. As a result, an engagement is ensured particularly quickly and, for example, even with a small angle of rotation in the locking direction. The second ring is also easy to manufacture. For example, the toothing is formed by a lateral surface of the second ring. The toothing is arranged radially inwards or radially outwards, for example.

In one embodiment of the drive arrangement, the drive arrangement has at least a first pawl region and a second pawl region. A pawl region is formed by pawls which are arranged closer together in the circumferential direction than other pawls of the pawl freewheel which do not belong to the pawl region. The pawls of a pawl region form a group of pawls. The pawls of a pawl region are evenly spaced. The first pawl region has at least two pawls. The second pawl region has at least one pawl. The pawl freewheel thus has at least three pawls, for example. For example, the pawl freewheel can have four paws, wherein two pawls are assigned to each pawl region. The pawl freewheel can also have three pawl regions, for example with two, three or more pawls per pawl region. Four or more pawl regions can also be provided. A large number of pawls makes it easier for the pawl freewheel to withstand high drive forces.

A distance in the circumferential direction between the pawls of the first pawl region differs from a distance in the circumferential direction between the two pawl regions. For example, a distance between the pawls of a pawl region is always smaller than a distance between different pawl regions. For example, a first pawl is arranged at the 11 o'clock position, a second pawl is at the 1 o'clock position, a third pawl is at the 5 o'clock position, and a fourth pawl is at the 7 o'clock position. The first and second pawls are then assigned to the first pawl region and the third and fourth pawls to the second pawl region. A distance between the pawls in each pawl region then corresponds to 60° and a distance between the two pawl regions corresponds to 120°. The distance between pawls in a pawl region is, for example, the shortest distance between neighbouring pawls. The distance between the pawl regions can be a distance between the outermost pawls of the pawl regions, which are neighbouring in the circumferential direction. The distance between the pawl regions can also be a distance between a centre in the circumferential direction of the respective pawl regions.

In one embodiment of the drive arrangement, it may be provided that the second pawl region has at least two pawls. A distance in the circumferential direction between the pawls of the second pawl region differs from a distance in the circumferential direction between the two pawl regions. The grouping in pawl regions means that the force application is very homogeneous and a large distance is possible for the respective sensors. For example, each pawl region can have an identical number of pawls.

In one embodiment of the drive arrangement, the pawls in the pawl regions are arranged evenly spaced in the circumferential direction on the first ring. For example, a distance between different neighbouring pawls of a pawl region is always identical. The pawls of each pawl region is arranged identically in the pawl regions. For example, all pawl regions can have three pawls, wherein all neighbouring pawls in each pawl region have an identical spacing in the circumferential direction.

In one embodiment of the drive arrangement, the pawl regions are arranged evenly spaced in the circumferential direction on the first ring. The distance in the circumferential direction between each neighbouring pawl region is therefore also identical. This results in a certain symmetry. All pawl regions can have identically arranged pawls. For example, each pawl region has at least two pawls.

In one embodiment of the drive arrangement, it may be provided that respective force transmission areas of the pawl regions are arranged symmetrically to a detection area of the sensor device. A force transmission area can be an area at which a pawl introduces forces into the first ring. The force transmission area can, for example, be an area on which the pawl is supported in the locked state. For example, the first ring has an associated pocket for each pawl, which has a rounded shape corresponding to an adjacent end of the pawl. The pawl is then supported there with this end on the first ring when the pawl is in engagement with the toothing on the second ring. A detection area is, for example, an area at which the sensor device measures the deformation of the first ring. The detection area is, for example, the area in which a strain gauge is attached to the first ring. The detection area can be a measuring point. For example, a distance in the circumferential direction from the two pawl regions to a detection area of the sensor device is the same. The sensor device can also have several detection areas. The pawl regions can be arranged symmetrically to one, some or all of the detection areas. Due to the symmetry, interference forces from the latches are more uniform in relation to the detection areas. If, for example, the pawls themselves are arranged symmetrically in relation to the detection area, the forces and thus also reaction forces and interference forces are introduced asymmetrically in relation to the detection area. For example, the force transmission areas are arranged axially symmetrically to an axis of symmetry extending vertically through an axis of rotation of the pawl freewheel. For example, a sensor of the sensor device is arranged on both sides of the axis of symmetry. Each of these sensors is, for example, arranged at a maximum distance from the axis of symmetry in the circumferential direction, for example, centred in the circumferential direction between two intersections of the circumference with the axis of symmetry. The sensors can be arranged on an axis perpendicular to the axis of symmetry on the inner wheel. The respective ends of the pawls engaging in the toothing can be arranged asymmetrically to the detection area.

In one embodiment of the drive arrangement, the sensor device detects the deformation of the first ring in at least one area that lies between the respective pawls in the circumferential direction, for example in the centre. For example, the detection area is arranged in a pawl-free area in the circumferential direction.

In one embodiment of the drive arrangement, the sensor device is detects the deformation of the first ring in an area in which a torque applied by a cyclist to the pedals of the bicycle drive is already totalled. This makes the detected deformation particularly suitable for controlling the drivetrain and, alternatively or additionally, for power detection. For example, the respective sensors are arranged on the first ring, for example axially in the area of the second ring. For example, all torques from both pedals of the bicycle can already be totalled on the first ring. If the pedal crankshaft forms the first ring, the torque applied, for example, is totalled axially in the area of the second ring or the pawls. For example, the torque from both pedals is totalled for the first time at the point where it is tapped from the pedal crankshaft. Alternatively, or additionally, the sensor device detects the deformation of the first ring in an area in which a torque applied by the cyclist to the pedals of the bicycle drive is not yet superimposed with a drive torque of the drive motor. For example, the drive motor is easily controlled depending on the driving force of the cyclist.

In one embodiment of the drive arrangement, the drive arrangement has a pedal crankshaft and an output shaft. The pedal crankshaft is, for example, permanently connected for conjoint rotation to one of the two rings. The output shaft is, for example, permanently connected for conjoint rotation to another of the two rings. The pedal crankshaft is mountable on a bicycle frame or drive housing. Crank arms are attachable for conjoint rotation to the pedal crankshaft on both sides at an axial end area. Pedals are rotatably mountable on the crank arms. The output shaft has a pinion, for example. The output shaft is mechanically operatively connected to a wheel, for example via a belt or a chain. The pawl freewheel connects the pedal crankshaft to the output shaft. In the locked state of the pawl freewheel, the output shaft is drivable by the pedal crankshaft. In the release state, on the other hand, the pedal crankshaft is decouplable from the output shaft, for example so that the pedal crankshaft cannot be driven by the wheel.

A second aspect relates to a bicycle with a drive arrangement according to the first aspect and an output element. The output element is, for example, a rear wheel of the bicycle. The output element is drivable by the drive arrangement, for example when the pawl freewheel is in its locked state. The respective advantages and further features can be found in the description of the first aspect, wherein embodiments of the first aspect also form embodiments of the second aspect and vice versa.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
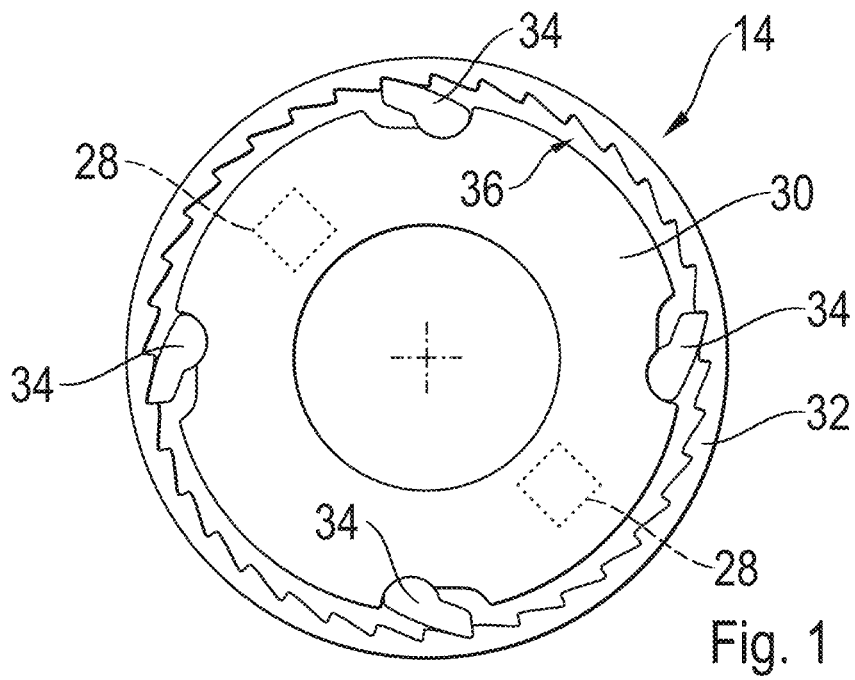
FIG. 1 illustrates a pawl freewheel for a drive arrangement of a bicycle according to the prior art in a schematic side view along an axis of rotation of the pawl freewheel.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 3:
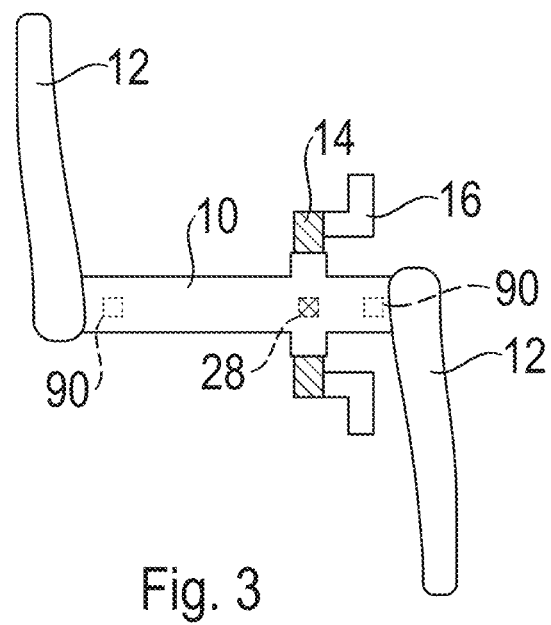
FIG. 3 illustrates an installation situation of a drive arrangement in a bicycle.

FIG. 3 schematically illustrates the installation of a drive arrangement in a bicycle. The drive arrangement has a pedal crankshaft 10 with crank arms 12 fixed to it on both sides. A pedal, not shown, is rotatably attached to each of the crank arms 12. The drive arrangement also has a pawl freewheel 14 and an output shaft 16 with pinion. The pawl freewheel 14 automatically switches between a locked state, in which the pawl freewheel 14 connects the pedal crankshaft 10 to the output shaft 16 for conjoint rotation, and a release state, in which the pedal crankshaft 10 is rotatable relative to the output shaft 16, depending on a relative direction of rotation of the pedal crankshaft 10 and the output shaft 16 with respect to each other. In the locked state, a torque is transmitted accordingly by the pawl freewheel 14.

The drive arrangement has a sensor device which detects a drive force applied to the pedal crankshaft 10 by the rider. In one embodiment, an electric drive motor of the bicycle is controlled as a function of the detected torque. Conventionally, the sensor device has two strain gauges 90 as sensors for this purpose, which are each arranged axially adjacent to one of the pedal crank arms 12 on the pedal crankshaft 10 in order to detect a drive force applied to the pawl freewheel 14. However, this can result in considerable disturbance variables due to a changing weight load from the rider. In addition, the measurements from both sides are then merged in order to record the total drive force applied.

Alternatively, the drive force applied to the pawl freewheel 14 is also detectable by measuring the deformation axially at the height of the pawl freewheel 14. FIG. 1 illustrates a conventional pawl freewheel 14 according to the prior art. This pawl freewheel 14 has a first ring 30, which is an inner ring and, in the example shown, is permanently connected for conjoint rotation to the pedal crankshaft 10 (FIG. 3). Four pawls 34 are movably, in this case pivotably, mounted on the first ring 30 on an outer circumference with an end section. The four pawls 34 are arranged evenly spaced in the circumferential direction on the first ring 30. An angular spacing of 90° is provided between all neighbouring pawls 34 in the circumferential direction. Furthermore, the pawl freewheel 14 has a second ring 32. The second ring 32 is an outer ring and, in the example shown in FIG. 1, is permanently connected for conjoint rotation to the output shaft 16 (FIG. 3). The second ring 32 has a toothing 36, which in the example shown points radially inwards and is formed on an inner lateral surface of the second ring 32. The toothing 36 is for engagement with respective ends of the pawls 34 facing away from the first ring 30. In the locked state of the pawl freewheel 14, the pawls 34 are in engagement with the toothing 36, so that the two rings 30, 32 are coupled to each other for conjoint rotation. In a release state, the pawls 34 slide on the toothing and thus allow the two rings 30, 32 to rotate relative to each other.

In a circumferential area between two neighbouring pawls 34, a sensor 28 is arranged on the first ring 30 on two opposite sides at an equal radial distance from an axis of rotation of the pawl freewheel 14. These two sensors 28 replace the strain gauges 90 (FIG. 3) in the sensor device. The sensors 28 are strain gauges and detect a deformation of the first ring 30 due to the applied drive force. Accordingly, the sensor device also detects a deformation of the first ring 30 of the pawl freewheel 14 due to the applied drive force. In the case of the pawl freewheel 14, the respective laterally applied drive forces are already added together to form a total applied drive force.

With the conventional pawl freewheel 14 shown in FIG. 1, however, considerable interference variables act in the measuring range of the two sensors 28. There are radial reaction forces in the pawls 34. In addition, the pawls 34 can engage unevenly due to manufacturing tolerances, as a result of which different amounts of drive force are transmitted by different pawls 34. Accordingly, detection of the applied drive force by the sensors 28 is inaccurate.

Figure 2:
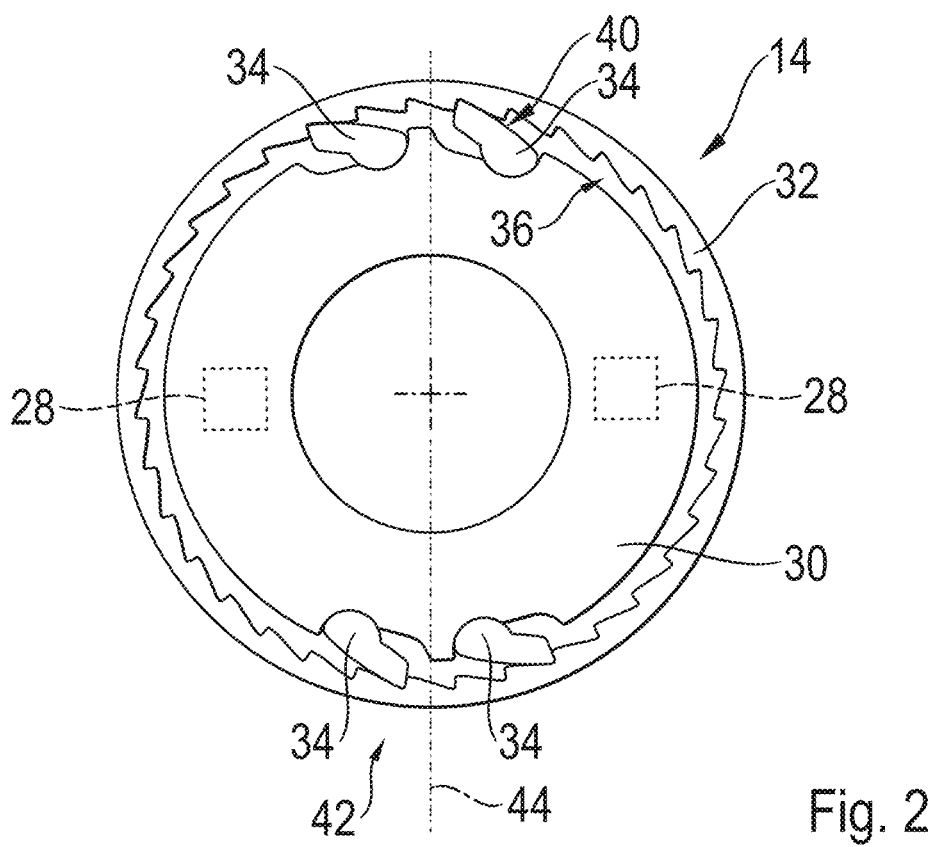
FIG. 2 illustrates a first embodiment of a pawl freewheel for a drive arrangement of a bicycle in a schematic side view along an axis of rotation of the pawl freewheel.

A first embodiment of the pawl freewheel 14, shown in FIG. 2, reduces these interference effects. The differences to the conventional pawl freewheel 14 shown in FIG. 1 are explained below. In this first embodiment, the pawls 34 are arranged unevenly spaced in the circumferential direction on the first ring 30. In the example shown, the first ring 30 has a first pawl region 40 and a second pawl region 42. Each pawl region 40, 42 has two pawls 34 which are arranged close to each other in the circumferential direction. In the example shown, an angular distance between the two pawls 34 of a pawl region is 30°. Accordingly, the pawls 34 facing each other in different areas are spaced further apart, in this case with an angular spacing of 150°. A distance in the circumferential direction between the pawls 34 within each of the two pawl regions 40, 42 thus differs from a distance in the circumferential direction between the two pawl regions 40, 42. Correspondingly, a large pawl-free circumferential area with an angular extent of 150° is provided between the pawl regions 40, 42, although a number of pawls 34 is the same as in the conventional pawl freewheel 14. The arrangement of the pawls 34 in each of the pawl regions 40, 42 is identical.

In the first embodiment, the two sensors 28 are arranged one in each pawl-free circumferential area, i.e. between the pawls 34 of the two pawl regions 40, 42. This results in a greater homogenization of the applied forces and also a lower influence of the disturbance variables from the pawls 34 in the measuring range of the sensors 28. The applied drive force is thus detected particularly precisely.

In the first embodiment of the pawl freewheel 14, the pawls 34 are arranged in pockets on an outer circumference of the first ring 30. A rounded end of the pawls 34, which faces the first ring 30 in the locked state, is supported on a base of the pockets in the locked state. In the first embodiment, the pockets and thus also the pawls 34 are each arranged symmetrically with respect to an arrangement of the two sensors 28 on the first ring 30 and thus also with respect to a detection range of the sensors 28. The corresponding axis of symmetry 44 is illustrated in FIG. 2. The sensors 28 are arranged axially symmetrically to the axis of symmetry 44, which extends radially through the axis of rotation of the pawl freewheel 14. However, this results in an asymmetrical arrangement of the force transmission areas to the detection areas of the sensor device.

Figure 4:
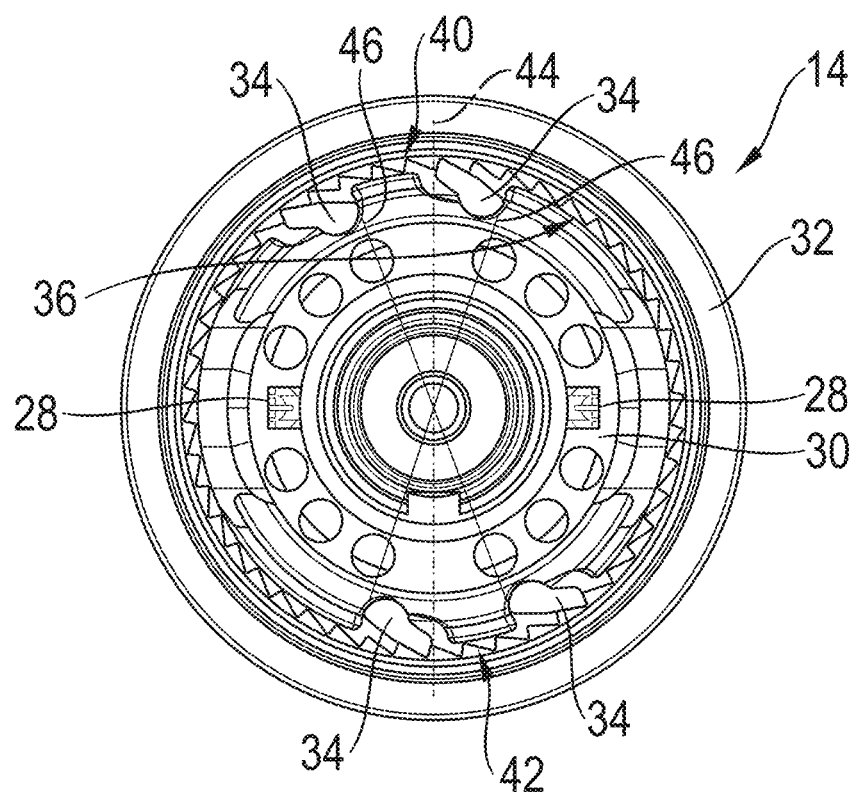
FIG. 4 illustrates a second embodiment of a pawl freewheel for a drive arrangement of a bicycle in a schematic side view along an axis of rotation of the pawl freewheel.

FIG. 4 shows a second embodiment of the pawl freewheel 14. The differences to the first embodiment of the pawl freewheel 14 according to FIG. 2 are explained below. In the second embodiment, the pockets and thus also the pawls 34 are arranged asymmetrically with respect to an arrangement of the two sensors 28 on the first ring 30 and thus also not axially symmetrically with respect to the detection areas of the sensors 28. Instead, the force transmission areas are arranged symmetrically to the detection areas of the sensor device and the sensors 28. This is recognized by the axis of symmetry 44 in FIG. 4. Furthermore, two lines 46 are drawn in FIG. 4, each of which forms a straight line between the force transmission area of the pawls 34 and the centre of the first ring 30. As shown, the force transmission areas are arranged symmetrically to the axis of symmetry and thus to the detection areas of the sensor device. This results in a more even application of force in relation to the sensors 28, which makes the detection of the applied drive force particularly precise.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 10 pedal crankshaft
12 crank arms
14 pawl freewheel
16 output shaft
28 sensors
30 first ring
32 second ring
34 pawls
36 toothing
40 first pawl region
42 second pawl region
44 axis of symmetry
46 line
90 strain gauges

The invention claimed is:

1. A drive arrangement for a bicycle, comprising:
a pawl freewheel (14), the pawl freewheel (14) comprising:
a first ring (30);
at least two pawls (34) movably mounted on the first ring (30), the at least two pawls (34) being unevenly spaced in a circumferential direction on the first ring (30); and
a second ring (32) having a toothing (36);
at least one sensor device (28) configured to detect a deformation of the first ring (30) of the pawl freewheel (14) due to an applied drive force; and
wherein the at least one sensor device (28) is configured to detect the deformation of the first ring (30) in a region defined between the at least two pawls (34) in the circumferential direction.

2. The drive arrangement of claim 1, wherein the first ring (30) is an inner ring, and the second ring (32) is an outer ring.

3. The drive arrangement of claim 1, wherein the first ring (30) is an outer ring, and the second ring (32) is an inner ring.

4. The drive arrangement of claim 1, wherein the toothing (36) of the second ring (32) is continuous in the circumferential direction.

5. The drive arrangement of claim 1, wherein the drive arrangement has at least a first pawl region (40) and a second pawl region (42),
wherein the at least two pawls (34) includes at least two first pawls (34) in the first pawl region (40) and at least one second pawl (34) in the second pawl region (42),
wherein a distance in the circumferential direction between the at least two first pawls (34) of the first pawl region (40) differs from a distance in the circumferential direction between the first pawl region (40) and the second pawl region (42).

6. The drive arrangement of claim 5, wherein the at least one second pawl (34) in the second pawl region (42) includes at least two second pawls (34),
wherein a distance in the circumferential direction between the at least two second pawls (34) of the second pawl region (42) differs from the distance in the circumferential direction between the first pawl region (40) and the second pawl region (42).

7. The drive arrangement of claim 6, wherein the at least two first pawls (34) in the first pawl region (40) are evenly spaced apart from each other in the circumferential direction on the first ring (30) and the at least two second pawls (34) of the second pawl region (42) are evenly spaced apart from each other in the circumferential direction on the first ring (30).

8. The drive arrangement of claim 5, wherein the first pawl region (40) and the second pawl region (42) are evenly spaced apart from each other in the circumferential direction on the first ring (30).

9. The drive arrangement of claim 5, wherein a force transmission region of each of the first pawl region (40) and the second pawl region (42) is symmetric with a detection region of the at least one sensor device (28).

10. The drive arrangement of claim 1, further comprising:
a pedal crankshaft (10); and
an output shaft (16), the pawl freewheel (14) connecting the pedal crankshaft (10) to the output shaft (16).

11. A bicycle, comprising the drive arrangement of claim 1, and an output element drivable by the drive arrangement.

* * * * *